United States Patent [19]

Ishida et al.

[11] 4,333,995
[45] Jun. 8, 1982

[54] LEAK PROOF CELLS PROVIDED WITH A SYNTHETIC RESIN GASKET HAVING AN INCREASED DEGREE OF CRYSTALLINITY

[75] Inventors: Osamu Ishida, Suita; Yoshio Uetani, Ibaraki; Seiichi Matsushima, Toyonaka, all of Japan

[73] Assignee: Hitachi Maxell, Ltd., Osaka, Japan

[21] Appl. No.: 163,512

[22] Filed: Jun. 27, 1980

[30] Foreign Application Priority Data

Jun. 28, 1979 [JP] Japan .................................. 54/81805
Jun. 28, 1979 [JP] Japan .................................. 54/81806
Jun. 28, 1979 [JP] Japan .................................. 54/81807
Jun. 28, 1979 [JP] Japan .................................. 54/81808

[51] Int. Cl.³ .............................................. H01M 2/08
[52] U.S. Cl. .................................... 429/172; 429/174; 429/185
[58] Field of Search ............................. 429/171–174, 429/185, 163, 164, 206; 277/2

[56] References Cited

U.S. PATENT DOCUMENTS

| | | | |
|---|---|---|---|
| 3,440,110 | 4/1969 | Arbter | 429/174 X |
| 3,713,896 | 1/1973 | Feldhake | 429/174 |
| 3,922,178 | 11/1975 | Winger | 429/206 X |
| 4,238,555 | 12/1980 | Uetani et al. | 429/174 X |
| 4,256,815 | 3/1981 | Smilanich | 429/171 X |

*Primary Examiner*—Anthony Skapars
*Attorney, Agent, or Firm*—Birch, Stewart, Kolasch & Birch

[57] ABSTRACT

A leak-proof cell comprising a positive can and a negative collector fitted in the opening of the positive can, a gasket made of a synthetic resin being set in the space between the positive can and the negative collector to prevent the leakage of any liquid material in the cell, characterized in that the degree of crystallinity of the gasket set in the cell is at least 10% higher than that of the gasket immediately after molding.

13 Claims, 4 Drawing Figures

LEAK PROOF CELLS PROVIDED WITH A SYNTHETIC RESIN GASKET HAVING AN INCREASED DEGREE OF CRYSTALLINITY

The present invention relates to improvements in cells. More particularly, it relates to cells provided with a synthetic resin gasket having an increased degree of crystallinity and consequently showing an improved elasticity and a reduced liquid-absorbing property.

In conventional cells, sealing is usually effected by setting a gasket made of synthetic resin such as polyolefins (e.g. polyethylene, polypropylene) or polyamides (e.g. nylon 6, nylon 66, nylon 610, nylon 11, nylon 12) into the opening of the positive can and crimping the flange of the positive can inwardly to press the gasket against a negative collector so that the contacting surfaces of the positive can, the gasket and the negative collector are closely contacted one another to prevent leaking of the electrolyte from the contacting surfaces. However, such synthetic resin gasket does not have a sufficient elasticity for prevention of leakage of the electrolyte, and deterioration of its elasticity is caused by absorption of the electrolyte so that the leak-poof property is apt to be lowered.

Many attempts have heretofore been made to overcome the said drawback. For example, the modification of the shape of the negative terminal plate for improving the leak-proof property has been proposed. Further, for example, the application of a liquid packing material such as asphalt pitch, an aliphatic polyamide or a fluorinated oil to the contacting surfaces of the gasket with the positive can and the negative collector has been proposed. However, even these proposals can not achieve a satisfying leak-proof property.

It has now been unexpectedly found that when a synthetic resin gasket is subjected to heat treatment under reduced pressure or in an inert gas, the crystallinity is increased with reduction of the liquid absorbing property, whereby the deterioration of the elasticity of the gasket is prevented. Accordingly, the use of such gasket in a cell is effective in improvement of the leak-proof property. This invention is based on the above finding.

The object of the invention is to provide a cell having excellent sealing property and leak-proof property by the use of a synthetic resin gasket not showing reduction of the elasticity due to absorption of the electrolyte.

The gaskets for cells prepared by punching or injection molding of synthetic resins have certain degrees of crystallinity depending on their kinds. The followings are typical examples: polyethylene, 40–70%; polypropylene, 50–65%; nylon 11 and nylon 12, 10–20%; nylon 6, nylon 66 and nylon 610, 20–38%; fluorine resins, 20–45%. When these gaskets are subjected to heat treatment under reduced pressure or in an inert gas, the degree of crystallinity is increased and the elasticity is improved. At the same time, the volume of the amorphous parts in the synthetic resin constituting the gasket is decreased so that the liquid-absorbing property is reduced and the decrease of the elasticity can be prevented.

In addition to the improved elasticity of the gasket, the close contact between the negative collector and the gasket is necessary for assurance of a good leak-proof property. Therefore, setting of the gasket onto the negative collector is desired to be effected in such a manner that a sufficiently close contact is achieved.

Setting of a shaped gasket onto the negative collector may be carried out by various procedures, of which typical examples are as follows: placing a gasket previously subjected to heat treatment and having an increased degree of crystallinity onto the negative collector; placing a gasket onto the negative collector and then effecting heat treatment to cause shrinkage; wetting a gasket having an inner diameter smaller than the outer diameter of the negative collector to enlarge the size of the gasket, placing the thus treated gasket onto the negative collector and then effecting heat treatment for drying to cause shrinkage of the gasket; insert molding of a gasket onto the negative collector to closely contact the synthetic resin to the negative collector and then effecting heat treatment to increase the degree of crystallinity and to realize further close contact between the gasket and the negative collector by shrinkage, etc. By selecting an appropriate one from these procedures, a cell having a high leak-proof property can be obtained.

In usual, the effect of improvement of the leak-proof property becomes larger with elevation of the degree of crystallinity, but depending on the kind of the synthetic resin, the obtainable degree of crystallinity is restricted. When the increment of the degree of crystallinity is small, the effect of improvement on the leak-proof property will become insufficient. Since the degree of crystallinity before the heat treatment is different depending on the kind of the synthetic resin, the extent of increment of the crystallinity should be decided according to the kind of the used synthetic resin. In general, the increment of 10% or more to the value before the heat treatment can afford a sufficient effect of improvement on the leak-proof property. The desirable degree of crystallinity to be obtained after the heat treatment depends on the kind of the synthetic resin, and some examples are as follows: polyethylene, 75–90%; polypropylene, 68–90%; nylon 11 and nylon 12, 25–60%; nylon 6, nylon 66 and nylon 610, 40–60%; fluorine resins, 50–95%.

As nylon 11, the one obtained by polycondensation of 11-aminoundecanoic acid and having a molecular weight of about 10,000–40,000 is desired. As nylon 12, the one obtained by ring opening polymerization of ω-laurolactam and having a molecular weight of about 10,000 to 40,000 is desirable.

The above mentioned synthetic resins may be employed solely or in a blended state. Further, they may be copolymers of the monomers which constitute the synthetic resins as exemplified above. In the latter case, the degree of crystallinity after the heat treatment may be appropriately decided according to the degree of crystallinity of each original resin.

The temperature of the heat treatment should be kept in the range from the glass transition temperature of the synthetic resin constituting the gasket to its melting point. Since the speed of the crystallization is small at a low temperature, adoption of a temperature of 100° C. or higher is desirable. In the case that the time of the heat treatment is desired to be short, a temperature exceeding the melting point of the synthetic resin constituting the gasket by about 10° C. may be adopted without disadvantage. The heat treatment may be carried out under reduced pressure or in an inert gas (e.g. nitrogen, argon, helium). The time of the heat treatment is varied depending on the treating temperature and may be usually from 1 to 10 hours.

The degree of crystallinity used in this specification is indicated by a numeral calculated from the determined value of the density according to the following equation:

$$\chi = \frac{d_c(d - d_a)}{d(d_c - d_a)} \times 100$$

wherein $\chi$ is the degree of crystallinity of the sample, $d_c$ is the density of the crystalline part, $d_a$ is the density of the amorphous part and d is the density of the sample. The density of the crystalline part ($d_c$) and the density of the amorphous part ($d_a$) are given by a standard sample or from a literature. Therefore, when the density of the sample (d) is obtained by actual measurement, the degree of crystallinity can be calculated according to the above equation.

With reference to the accompanying drawings.

Figure 1:
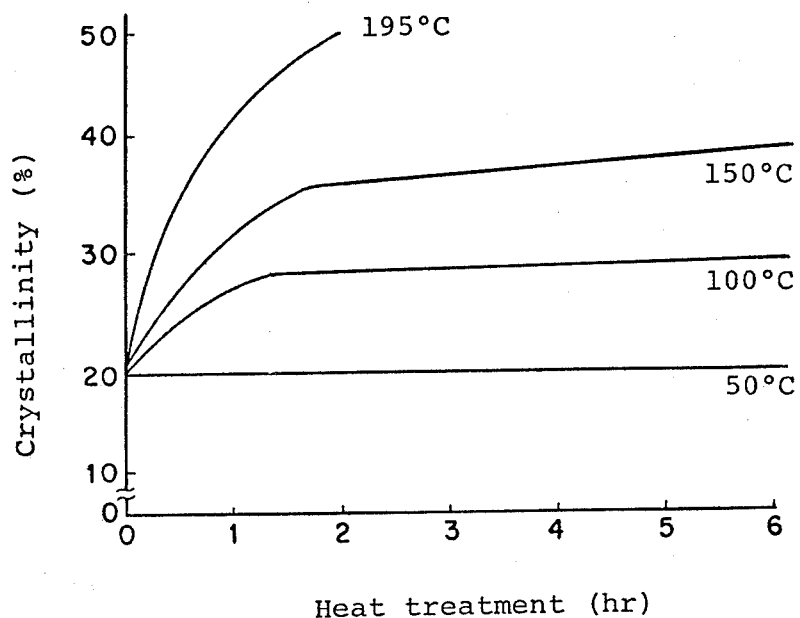
FIG. 1 is a graph showing the relationship between the heat treatment time and the degree of crystallinity in a nylon 11 gasket.
Figure 2:
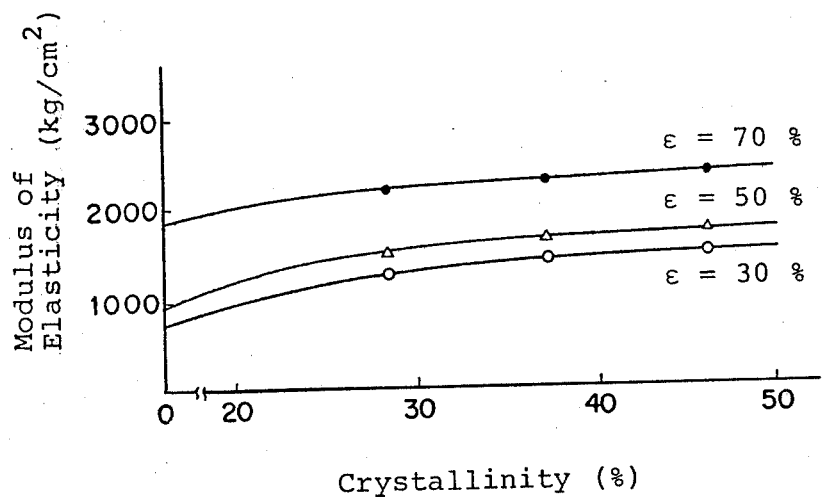
FIG. 2 is a graph showing the relationship between the degree of crystallinity and the modulus of elasticity in a nylon 11 gasket.
Figure 3:
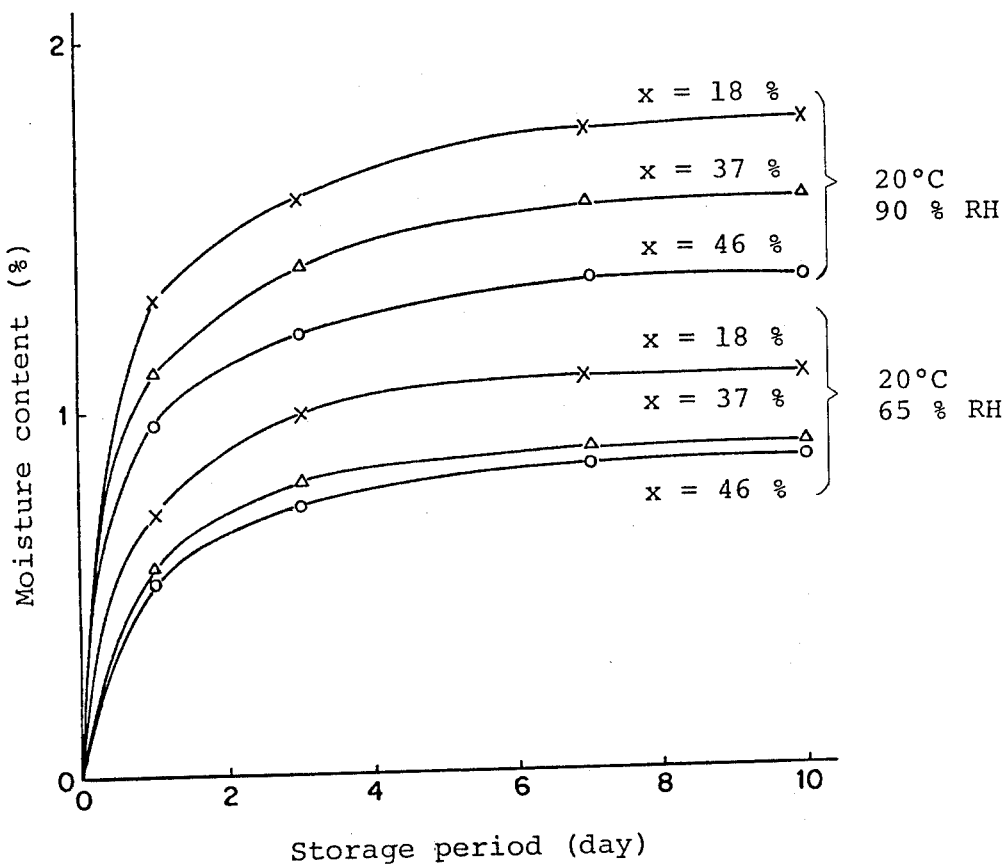
FIG. 3 is a graph showing the relationship between the storage period and the moisture content in a nylon 11 gasket.

In FIG. 1, there are shown the relationships between the treating time and the degree of crystallinity when treated under reduced pressure at 50° C., 100° C., 150° C. and 195° C. FIG. 2 shows the relationships between the degree of crystallinity and the modulus of elasticity in the nylon 11 gasket heat treated as in FIG. 1 under strains of 30%, 50% and 70%. FIG. 3 shows the relationships between the storage period and the moisture content in case of storing a nylon 11 gasket with a varied degree of crystallinity ($\chi$) (18%, 37%, 46%) at 20° C. in relative humidities of 65% and 90%. With increase of the degree of crystallinity of the gasket, as shown in FIG. 2 and FIG. 3, the modulus of elasticity becomes larger, and the water-absorbing property is lowered.

Figure 4:
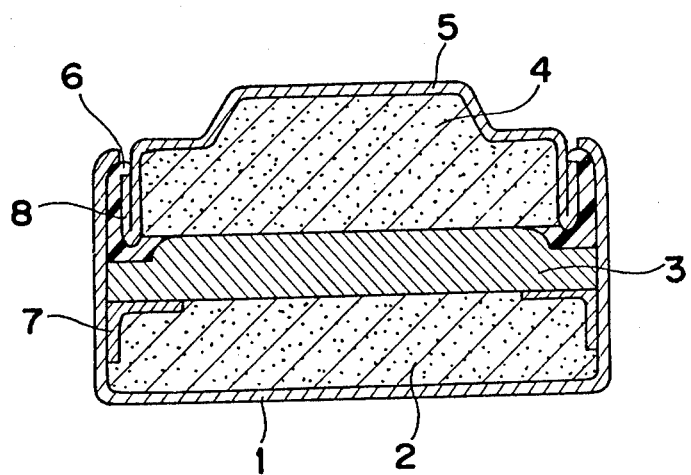
FIG. 4 is a sectional view showing the structure of an SR-44 button type alkaline cell.

FIG. 4 is a sectional view of a cell according to the invention containing an alkaline electrolyte which shows the creep phenomenon and causes leakage the most frequently among various kinds of electrolyte for cells. This alkaline cell is prepared by inserting the positive pellet (2) into the bottom of the positive can (1), adding a portion of the electrolyte thereto, placing the separator (3) on the upper part of the positive pellet (2), setting the negative terminal plate (5) containing the negative electrode (4) into the opening of the positive can (1) with interposition of the annular synthetic resin gasket (6) having a L-shaped section and crimping the flange of the positive can (1) inwardly to seal the can so as to keep the inside of the cell in a liquid-filled state. The gasket (6) is previously subjected to heat treatment to increase its degree of crystallinity. Alternatively, the gasket (6) it may set onto the negative terminal plate (5) prior to setting into the opening of the positive can (1) and then heated under reduced pressure or in an inert gas. In some cases, the heat treatment of the gasket under reduced pressure or in an inert gas may be effected after its insert molding onto the negative terminal plate (5) to cause shrinkage, whereby the close contact with the negative terminal plate (5) is achieved.

The positive can (1) is usually made of nickel-plated iron. The positive pellet (2) may be composed of 99 to 80% by weight of a positive active material such as silver(I) oxide, manganese dioxide, silver(II) oxide, mercury oxide or nickel oxyhydroxide and 1 to 20% by weight of a conductive material such as graphite. Usually, the positive pellet (2) is firmly fixed by an annular frame of metal such as iron, nickel or stainless steel (7). The separator (3) may be, for example, a laminated product composed of a microporous polypropylene film subjected to hydrophilic treatment, cellophane and vinylon-rayon mixed paper. The negative electrode (4) may be prepared by pouring a large amount of an alkaline electrolyte such as 25 to 40% aqueous solution of potassium hydroxide or 20 to 30% aqueous solution of sodium hydroxide onto amalgamated zinc optionally incorporated with a dispersing agent for gelation such as sodium polyacrylate, carboxymethyl cellulose or starch. In the negative terminal plate (5), a nickel layer affording a beautiful appearance or a corrosion-resistance is present on the outer surface of a steel plate, and a copper layer is present on the inner surface for prevention of formation of a local cell with zinc. The negative terminal plate having such a structure is usually prepared by subjecting a clad plate composed of a steel plate, a nickel layer and a copper layer to drawing to obtain a shape having the peripheral lappet portion (8). Alternatively, the steel plate is previously subjected to the above mentioned processing for shaping, and then the nickel layer and the copper layer are formed by plating. Between the contact surfaces of the gasket (6) and the positive can (1) and the negative terminal plate (5), a liquid packing material such as asphalt pitch, an aliphatic polyamide or fluorinated oil is usually interposed.

The present invention is applicable not only to the preparation of the above mentioned button type cell but also to the preparation of a cylindrical cell. Also in case of a cylindrical cell, the heat treatment of the gasket may be effected by any of the above mentioned procedures, i.e. previous heating prior to setting onto the negative terminal plate to which the negative lead material is fixed, heating after the insert molding, etc.

According to the invention, a gasket whose degree of crystallinity is increased to enhance the elasticity and reduce the liquid-absorbing property is set into a cell. The invention is also applicable to the preparation of a cell containing a non-aqueous electrolyte which does not dissolve the gasket. For example, in a lithium cell which contains lithium metal as the negative electrode and in which a non-aqueous electrolyte obtained by dissolving lithium perchlorate into a solution mixture of propylene carbonate and dimethoxyethane is employed, a synthetic resin being insoluble in this non-aqueous electrolyte (e.g. polypropylene, polychlorotrifluoroethylene, polytetrafluoroethylene, polyethylene) may be selected as the material for the gasket.

The present invention will be hereinafter explained further in detail by taking the case of an alkaline cell as shown in FIG. 4 which is susceptible to leakage of the electrolyte.

EXAMPLE 1

An annular gasket having a L-shaped section, prepared by injection molding a synthetic resin as shown in Table 1, was subjected to heat treatment under reduced pressure as shown in the said table to regulate its crystallinity. After stored for about one day, the gasket was immersed into a 5% toluene solution of asphalt pitch and then taken out. After evaporation of toluene, the gasket was set onto a negative collector for cell and then allowed to stand at 60° C. for 8 hours under a pressure of about 10 mmHg for drying. Using the thus obtained combination of the negative collector and the gasket, an alkaline cell of SR-44 type according to JIS (Japanese Industrial Standard) C 8511 having a structure as shown in FIG. 4 was prepared (Cell Nos. 1 to 22; each 100 cells).

EXAMPLE 2

A nylon 11 gasket was set onto a negative collector, and then the resultant combination of the gasket and the negative collector was heated at 150° C. for 2 hours under reduced pressure. The degree of the crystallinity of the nylon 11 gasket calculated at this time was 37%. Then, the pitch-coating as in Example 1 was carried out, and 100 alkaline cells (Cell No. 23) as shown in FIG. 4 were prepared.

EXAMPLE 3

Around the periphery of a negative collector, a nylon 11 gasket was formed by insert molding, and the resultant combination of the negative collector and the gasket was subjected to heat treatment at 150° C. for 2 hours under reduced pressure. Then, 100 alkaline cells (Cell No. 24) were prepared as in Example 2.

In all of the cells prepared in these Examples, silver(I) oxide was used as the positive pellet, and an aqueous solution containing 5% by weight of zinc oxide and 35% by weight of potassium hydroxide was used as the electrolyte.

The thus obtained cells were allowed to stand at 60° C. under a relative humidity of 90% and then taken out (each 100 cells). After the surface of the cell was cleaned well, an indicator obtained by dissolving Cresol Red (0.1 part by weight) into a mixture of water (80 parts by weight) and ethyl alcohol (20 parts by weight) was dropped onto the gasket position of the outer surface of the cell to detect the alkaline electrolyte. The colored ones were taken as leaked and the number of colored cells was counted. In Example 1 (Cells Nos. 1–22), the cells were allowed to stand for 20 to 100 days, and in Examples 2 and 3 (Cell Nos. 23 and 24), the cells were allowed to stand for 60 to 250 days. The numbers of the colored cells in Example 1 and in Examples 2 and 3 are shown in Table 1 and Table 2, respectively.

TABLE 1

| Cell No. | Material for gasket | Conditions for heat treatment (Temp. (°C.) × Time (hr)) | Crystallinity (%) | Number of leaked cells/100 cells | | | | |
|---|---|---|---|---|---|---|---|---|
| | | | | After 20 days | After 40 days | After 60 days | After 80 days | After 100 days |
| 1 | Nylon 11 | Not treated | 18 | 5 | 6 | 15 | 28 | 50 |
| 2 | Nylon 11 | 100 × 1 | 27 | 0 | 0 | 2 | 5 | 12 |
| 3 | Nylon 11 | 100 × 2 | 28 | 0 | 0 | 2 | 4 | 10 |
| 4 | Nylon 11 | 150 × 1 | 32 | 0 | 0 | 0 | 2 | 4 |
| 5 | Nylon 11 | 150 × 2 | 37 | 0 | 0 | 0 | 1 | 2 |
| 6 | Nylon 11 | 190 × 1 | 41 | 0 | 0 | 0 | 0 | 2 |
| 7 | Nylon 11 | 190 × 3 | 46 | 0 | 0 | 0 | 0 | 1 |
| 8 | Polypropylene | Not treated | 55 | 10 | 25 | 70 | 100 | 100 |
| 9 | Polypropylene | 130 × 6 | 68 | 1 | 5 | 15 | 50 | 100 |
| 10 | Polypropylene | 150 × 6 | 75 | 0 | 2 | 8 | 20 | 50 |
| 11 | Polyethylene | Not treated | 55 | 12 | 30 | 75 | 100 | 100 |
| 12 | Polyethylene | 130 × 5 | 80 | 0 | 3 | 10 | 22 | 55 |
| 13 | Nylon 12 | Not treated | 18 | 4 | 5 | 13 | 25 | 45 |
| 14 | Nylon 12 | 180 × 6 | 48 | 0 | 0 | 0 | 0 | 1 |
| 15 | Nylon 66 | Not treated | 37 | 45 | 95 | 100 | 100 | 100 |
| 16 | Nylon 66 | 200 × 2 | 44 | 6 | 16 | 33 | 60 | 85 |
| 17 | Nylon 610 | Not treated | 25 | 8 | 12 | 20 | 42 | 65 |
| 18 | Nylon 610 | 200 × 2 | 45 | 5 | 8 | 13 | 20 | 36 |
| 19 | Nylon 6 | Not treated | 35 | 21 | 45 | 100 | 100 | 100 |
| 20 | Nylon 6 | 200 × 2 | 45 | 7 | 27 | 50 | 95 | 100 |
| 21 | Polychlorotrifluoroethylene | Not treated | 40 | 1 | 5 | 12 | 30 | 50 |
| 22 | Polychlorotrifluoroethylene | 180 × 5 | 70 | 0 | 0 | 1 | 2 | 5 |

TABLE 2

| Cell No. | Number of leaked cells/100 cells | | | | |
|---|---|---|---|---|---|
| | After 60 days | After 100 days | After 150 days | After 200 days | After 250 days |
| 23 | 0 | 1 | 2 | 7 | 20 |
| 24 | 0 | 0 | 2 | 5 | 15 |

As apparent from Table 1, the cell of the invention which contains a gasket having an increased degree of crystallinity is superior in leak-proof property to conventional cells in which the degree of crystallinity of the gasket is not increased. Leakage of the electrolyte is not caused even after allowing to stand for 20 days in case of using the nylon 11 gasket with the degree of crystallinity of 27% or more, the polypropylene gasket with the degree of crystallinity of 75% or more, the polyethylene gasket with the degree of crystallinity of 80% or more, the nylon 12 gasket with the degree of crystallinity of 48% or more, the nylon 66 gasket with the degree of crystallinity of 44% or more and the polychlorotrifluoroethylene with the degree of crystallinity of 70% or more.

It is shown from Table 2 that, in the cell of the invention prepared by forming a gasket around the periphery of the negative collector by insert molding and then effecting heat treatment under reduced pressure or in an inert gas, leakage of the electrolyte is not caused even after allowing to stand for 100 days.

What is claimed is:

1. A leak-proof cell comprising a positive can and a negative collector fitted in the opening of the positive can, a gasket made of a synthetic resin being set in the space between the positive can and the negative collector to prevent the leakage of any liquid material in the cell, characterized in that the degree of crystallinity of the gasket set in the cell is at least 10% higher than that of the gasket immediately after molding.

2. The leak-proof cell according to claim 1, wherein the gasket set in the cell is made of polyethylene having a degree of crystallinity of 75 to 90%.

3. The leak-proof cell according to claim 1, wherein the gasket set in the cell is made of polypropylene having a degree of crystallinity of 68 to 90%.

4. The leak-proof cell according to claim 1, wherein the gasket set in the cell is made of nylon 11 having a degree of crystallinity of 25 to 60%.

5. The leak-proof cell according to claim 1, wherein the gasket set in the cell is made of nylon 12 having a degree of crystallinity of 25 to 60%.

6. The leak-proof cell according to claim 1, wherein the gasket set in the cell is made of nylon 6 having a degree of crystallinity of 40 to 60%.

7. The leak-proof cell according to claim 1, wherein the gasket set in the cell is made of nylon 66 having a degree of crystallinity of 40 to 60%.

8. The leak-proof cell according to claim 1, wherein the gasket set in the cell is made of nylon 610 having a degree of crystallinity of 40 to 60%.

9. The leak-proof cell according to claim 1, wherein the gasket set in the cell is made of polytetrafluoroethylene having a degree of crystallinity of 50 to 95%.

10. The leak-proof cell according to claim 1, wherein the gasket set in the cell is made of polychlorotrifluoroethylene having a degree of crystallinity of 50 to 75%.

11. The leak-proof cell according to claim 1, wherein the gasket set in the cell is the one increased in the degree of crystallinity by heating under reduced pressure or in an inert gas.

12. The leak-proof cell according to claim 1, wherein the gasket set in the cell is the one increased in the degree of crystallinity after provided in the negative collector.

13. The leak-proof cell according to claim 12, wherein the gasket is provided on the circumferential fringe with an insert mold.

* * * * *